(12) United States Patent
Yamashiro

(10) Patent No.: US 9,897,453 B2
(45) Date of Patent: Feb. 20, 2018

(54) POSITION INFORMATION CORRECTING DEVICE AND POSITION INFORMATION CORRECTING APPLICATION PROGRAM PRODUCT

(71) Applicant: DENSO CORPORATION, Kariya, Aichi-pref. (JP)

(72) Inventor: Takahisa Yamashiro, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 7 days.

(21) Appl. No.: 15/116,874

(22) PCT Filed: Jan. 21, 2015

(86) PCT No.: PCT/JP2015/000247
§ 371 (c)(1),
(2) Date: Aug. 5, 2016

(87) PCT Pub. No.: WO2015/122120
PCT Pub. Date: Aug. 20, 2015

(65) Prior Publication Data
US 2017/0184407 A1    Jun. 29, 2017

(30) Foreign Application Priority Data
Feb. 11, 2014 (JP) .................................. 2014-023934

(51) Int. Cl.
*G01C 21/32* (2006.01)
*G01C 21/28* (2006.01)
(Continued)

(52) U.S. Cl.
CPC .............. *G01C 21/28* (2013.01); *G01S 19/51* (2013.01); *H04W 4/023* (2013.01); *G01S 19/13* (2013.01); *H04W 4/028* (2013.01)

(58) Field of Classification Search
CPC ........ G01C 21/28; G01C 21/12; G01C 21/32; G01S 19/51; G01S 19/13; G01S 5/0072;
(Continued)

(56) References Cited

U.S. PATENT DOCUMENTS 5,926,117 A * 7/1999 Gunji ..................... G01S 19/04
340/988
6,720,920 B2 * 4/2004 Breed .................. B60N 2/2863
342/357.31
(Continued)

FOREIGN PATENT DOCUMENTS

JP   2003254775 A   9/2003
JP   2005184330 A   7/2005
(Continued)

OTHER PUBLICATIONS

Sweeney et al., Comparative performance of various automotive navigation technologies, 1993, IEEE,p. 437-440.*
(Continued)

*Primary Examiner* — McDieunel Marc
(74) *Attorney, Agent, or Firm* — Harness, Dickey & Pierce, P.L.C.

(57) ABSTRACT

A position information correcting device includes a reception processing unit receiving position information transmitted from a nearby mobile object, a position correcting unit performing a position correcting process for correcting, based on map data, the position information of the nearby mobile object such that a corrected position of the nearby mobile object is on a running area of a road, a nearby mobile object type acquiring unit acquiring a mobile object type of the nearby mobile object, and a correction performance determining unit determining, based on the mobile object type acquired by the nearby mobile object type acquiring unit, whether the position correcting process needs to be performed to the position information of the nearby mobile (Continued)

object. The position correcting process is performed to the position information of the nearby mobile object only when the correction performance determining unit determines that the position correcting process needs to be performed.

17 Claims, 7 Drawing Sheets

(51) Int. Cl.
*G01S 19/51* (2010.01)
*H04W 4/02* (2018.01)
*G01S 19/13* (2010.01)

(58) Field of Classification Search
CPC ......... H04W 4/023; H04W 4/028; B60T 7/22; G11B 20/10009
See application file for complete search history.

(56) References Cited

U.S. PATENT DOCUMENTS

| | | | | |
|---|---|---|---|---|
| 6,850,844 B1* | 2/2005 | Walters | ................ | G01C 21/165 701/410 |
| 7,949,466 B2* | 5/2011 | Atarashi | ................ | G01C 21/32 340/988 |
| 8,260,325 B2* | 9/2012 | Bando | ................ | G01S 5/0072 455/404.2 |
| 8,538,671 B2* | 9/2013 | Lee | ................ | G01C 21/12 701/300 |
| 8,547,810 B2* | 10/2013 | Yuri | ................ | G11B 20/10009 369/124.14 |
| 2009/0005929 A1* | 1/2009 | Nakao | ................ | B60T 7/22 701/33.4 |
| 2011/0244881 A1* | 10/2011 | Bando | ................ | G01S 5/0072 455/456.1 |
| 2016/0224027 A1* | 8/2016 | Yamamoto | ............ | B60W 30/09 |

FOREIGN PATENT DOCUMENTS

| | | |
|---|---|---|
| JP | 2005328283 A | 11/2005 |
| JP | 2008185454 A | 8/2008 |
| JP | 2008292232 A | 12/2008 |
| JP | 2009288022 A | 12/2009 |
| JP | 2012185758 A | 9/2012 |

OTHER PUBLICATIONS

Xue et al., Map matching algorithm design based on GPS information, 2014, IEEE, p. 898-901.*
Wang et al., The application of GPS data processing technique in map matching, 2012, IEEE. p. 588-591.*
Piran et al., Total GPS-free Localization Protocol for Vehicular Ad Hoc and Sensor Networks (VASNET), 2011, IEEE, p. 388-393.*
Fengli et al., Location Management in Mobile Environment, 2004, IEEE, p. 1491-1496.*

* cited by examiner

POSITION INFORMATION CORRECTING DEVICE AND POSITION INFORMATION CORRECTING APPLICATION PROGRAM PRODUCT

CROSS REFERENCE TO RELATED APPLICATIONS

This application is a U.S. National Phase Application under 35 U.S.C. 371 of International Application No. PCT/JP2015/000247 filed on Jan. 21, 2015 and published in Japanese as WO 2015/122120 A1 on Aug. 20, 2015. This application is based on and claims the benefit of priority from Japanese Patent Application No. 2014-023934 filed on Feb. 11, 2014. The entire disclosures of all of the above applications are incorporated herein by reference.

TECHNICAL FIELD

The present disclosure relates to a position information correcting device which acquires position information of a nearby mobile object and corrects the position information on the basis of map data, and also relates to a position information correcting application program product.

BACKGROUND ART

Patent Literature 1 discloses a technique which corrects position information received from a nearby vehicle by vehicle-to-vehicle communication or the like using map data. This kind of technique is also known as a map matching technique. In the map matching technique, when the position information of the nearby vehicle shows a position away from a road, the position information is corrected to show that the nearby vehicle is present on the road.

A drive assist system which assists a driving operation by a driver using the position information of a nearby vehicle has also been proposed. This kind of drive assist systems includes a drive assist system which displays the relative positions of the nearby vehicle and a host vehicle, a drive assist system which determines the possibility of a collision from the relative positions between the nearby vehicle and the host vehicle and warns the driver of the collision possibility, and the like.

In Patent Literature 1, as a mobile object which transmits the position information, only a vehicle is assumed. However, in recent years, a mobile terminal having a terminal GPS function such as, e.g., a smartphone or a tablet has been widely used. Accordingly, a pedestrian, a bicycle, or the like carrying a mobile terminal of this type device may also become the mobile object that transmits the position information.

In view of such a background, a drive assist system which uses the position information of not only a vehicle, but also a mobile object other than the vehicle may be considered. That is, a drive assist device which displays the relative positions of a nearby mobile object and a host vehicle using the position information of different types of nearby mobile objects such as a vehicle and a pedestrian, or a drive assist device which determines the probability of a collision or the like from the relative positions of the nearby mobile objects and the host vehicle and warns a driver of the collision probability may be considered.

However, when the position information of a mobile object other than a vehicle, such as a pedestrian, is subjected to map matching in the same manner as with a vehicle, it follows that, e.g., a pedestrian who is originally present at a position away from a road seems to be present on the road.

When the drive assist device described above displays the position of the nearby mobile object on the basis of the corrected position information that shows an erroneous position, the pedestrian who is actually not present on the road is displayed in such a manner as to be seemingly present on the road. This may unintentionally confuse the driver.

PRIOR ART LITERATURE

Patent Literature

Patent Literature 1: JP 2005-328283 A

SUMMARY OF INVENTION

In view of the foregoing difficulties, it is an object of the present disclosure to provide a position information correcting device and a position information correcting application program product each of which reduces a possibility that position information of a mobile object, which is not present on a road, is corrected to be present on the road when performing a position information correction to the mobile object using map data.

According to an aspect of the present disclosure, a position information correcting device includes a reception processing unit, a position correcting unit, a nearby mobile object type acquiring unit, and a correction performance determining unit. The reception processing unit receives position information transmitted from a nearby mobile object. The position correcting unit performs a position correcting process for correcting, based on map data, the position information of the nearby mobile object such that a corrected position of the nearby mobile object is on a running area of a road. The nearby mobile object type acquiring unit acquires a mobile object type of the nearby mobile object. The correction performance determining unit determines whether the position correcting process needs to be performed to the position information of the nearby mobile object. The reception processing unit receives, from the nearby mobile object, mobile object type information which indicates the mobile object type of the nearby mobile object, and the nearby mobile object type acquiring unit acquires the mobile object type of the nearby mobile object from the mobile object type information received by the reception processing unit. The nearby mobile object type acquiring unit includes a nearby mobile object type specifying unit that specifies the mobile object type of the nearby mobile object based on a moving speed of the nearby mobile object. The correction performance determining unit compares the mobile object type of the nearby mobile object indicated by the mobile object type information received by the reception processing unit with the mobile object type of the nearby mobile object specified by the nearby mobile object type specifyinq unit, and determines whether the position correcting process needs to be performed based on a comparison result of the two mobile object types acquired by the nearby mobile object type acquiring unit. The position correcting unit performs the position correcting process to the position information of the nearby mobile object when the correction performance determining unit determines that the position correcting process needs to be performed. The position correcting unit does not perform the position correcting process to the position information of the nearby mobile object when the correction performance determining unit determines that the position correcting process need not be performed.

In the foregoing device, when the correction performance determining unit determines that the position information of the nearby mobile object should be corrected based on the mobile object type, the position correcting unit corrects position information of the nearby mobile object using the map data. Further, when the correction performance determining unit determines that the position information of the nearby mobile object should not be corrected, the position correcting unit does not correct position information of the nearby mobile object.

In the configuration described above, for example, when the correction performance determining unit determines that correction should not be performed for the nearby mobile object whose mobile object type is a pedestrian, the position correcting unit does not correct the position information received from the pedestrian. That is, the position information transmitted from a pedestrian is not corrected such that the pedestrian seems to be present on a road.

As described above, for the nearby mobile object for which the correction performance determining unit determines that the position information of the nearby mobile object should not be corrected based on the mobile object type, the position correcting unit does not correct the position information. Herein, the nearby mobile object is a transmission source of the position information. Thus, it is possible to reduce a possibility that the position information of the mobile object, which is not present on a road, is corrected to be present on the road when performing the position information correction to the mobile object using map data.

According to another aspect of the present disclosure, position information correcting application program product is stored in a computer readable non-transitory tangible storage medium, and includes instructions to be executed by a computer. Operations to be implemented by the instructions include receiving position information transmitted from a nearby mobile object, performing a position correcting process for correcting, based on map data, the position information of the nearby mobile object such that a corrected position of the nearby mobile object is on a running area of a road, receiving mobile object type information from the nearby mobile object, acquiring a mobile object type of the nearby mobile object indicated by the mobile object type information that is received, specifying a mobile object type of the nearby mobile object based on a moving speed of the nearby mobile object, comparing the mobile object type that is indicated by the mobile object type information with the mobile object type that is specified based on the moving speed of the nearby mobile object, determining, based on a comparison result of the mobile object type that is indicated by the mobile object type information with the mobile object type that is specified based on the moving speed of the nearby mobile object, whether the position correcting process needs to be performed to the position information of the nearby mobile object, performing the position correcting process to the position information of the nearby mobile object when determining that position correcting process needs to be performed, and not performing the position correcting process to the position information of the nearby mobile object when determining that the position correcting process need not be performed.

With the above-described position information correcting application program product, advantages similar to the advantages provided by the foregoing position information correcting device may be provided.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

The following will describe an embodiment of the present disclosure with reference to the drawings. A position information sharing system 100 according to the present embodiment includes multiple communication terminals used in different types of mobile objects. Each of the communication terminals transmits, toward around area, the position information of own communication terminal while receiving position information transmitted from another communication terminal. In this manner, each communication terminal shares the position information of individual communication terminals. The type of the mobile object for which the communication terminal is used may include a normal vehicle, a construction vehicle, a pedestrian, a light vehicle (e.g., bicycle), and the like.

The construction vehicle mentioned hereinafter is assumed as a preset type of vehicle used in a construction site such as a bulldozer, a rough terrain crane, or a mixer vehicle. The normal vehicle mentioned herein is assumed to indicate a vehicle other than the construction vehicle. For example, the normal vehicle may include a passenger vehicle, a transportation purpose vehicle such as a bus, a motor truck or the like. As will be described below, the communication terminal may be a vehicle mounted terminal which is mounted in a vehicle, or may be a mobile terminal carried by a user.

Figure 1:
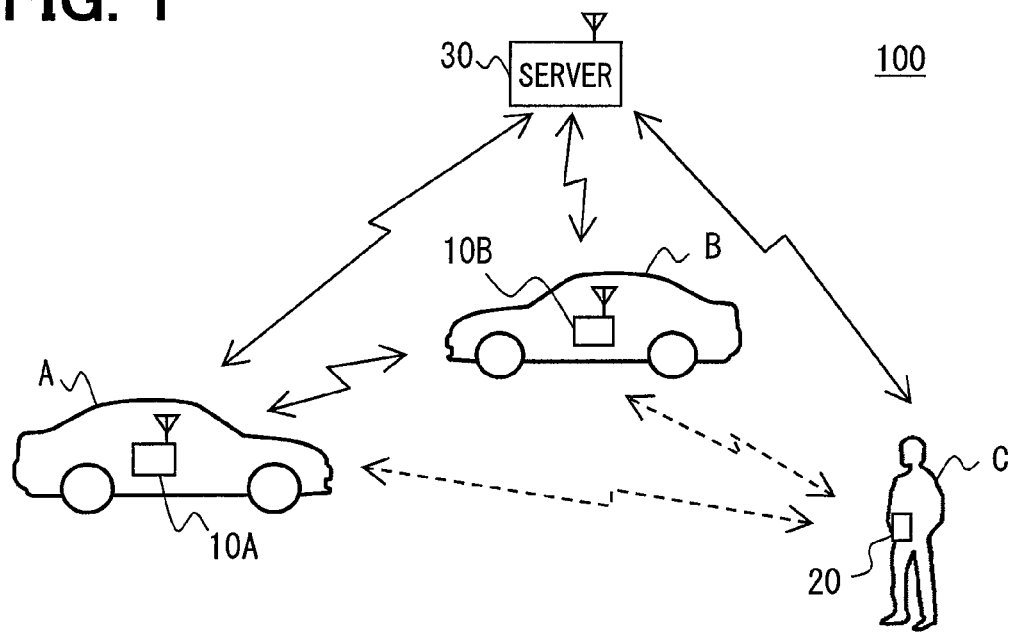
FIG. 1 is a block diagram showing an example of a schematic configuration of a position information sharing system in an embodiment of the present disclosure.

FIG. 1 shows an example of a schematic configuration of the position information sharing system 100. The position information sharing system 100 includes vehicle mounted terminals 10A and 10B, a mobile terminal 20, and a server 30. The vehicle mounted terminals 10A, 10B and the mobile terminal 20 correspond to the communication terminals described above. The vehicle mounted terminals 10A and 10B are mounted in vehicles A and B, respectively. The mobile terminal 20 is carried by, e.g., a pedestrian C.

As the mobile terminal 20, a well-known smartphone, a well-known tablet terminal, or the like can be used. When a special purpose application program (hereinafter referred to as a position information sharing application) is installed in a normal terminal, such as a smartphone, and the application is in operating state, the normal terminal functions as the mobile terminal 20 of the position information sharing system 100. That is, the position information sharing application controls the normal terminal, such as a smartphone, to operate as the mobile terminal 20 of the information sharing system. The position information sharing application is stored, as a position information correcting application program product, in a computer readable non-transitory tangible storage medium.

FIG. 1 shows, as an example, a situation where the mobile terminal 20 is carried by the pedestrian C. Alternatively, the mobile terminal 20 may also be carried by the driver of a light vehicle or the driver of a vehicle. When the vehicle A is assumed to be a host vehicle, the vehicle B and the pedestrian C correspond to mobile objects present around the host vehicle (hereinafter the mobile objects present around the host vehicle are referred to as nearby mobile objects). Each of the vehicle mounted terminals 10A and 10B has the same function and will be hereinafter referred to as the vehicle mounted terminal 10 when there is no need to distinguish the vehicle mounted terminals 10A and 10B. Also, each of the vehicle mounted terminal 10 and the mobile terminal 20 included in the position information sharing system 100 may be referred to as mobile terminal for simplification.

Each of the vehicle mounted terminals 10A and 10B and the mobile terminal 20 transmits the position information of own terminal and receive the position information transmitted from another terminal to share the position information of the individual terminals. The vehicle mounted terminals 10A and 10B may share the position information by performing well-known vehicle-to-vehicle communication between the terminals 10A and 10B. It is assumed that the vehicle-to-vehicle communication mentioned herein uses a broadcast communication method. On the other hand, the communication between the mobile terminal 20 and the vehicle mounted terminal 10 is performed via a well-known communication network such as a telephone network or the Internet.

The server 30 is a server provided on a communication network. The server 30 has the function of selecting a communication partner for each of the communication terminals which are included in the position information sharing system 100. Specifically, for each of the communication terminals which share the position information via the communication network within the position information sharing system 100, the server 30 selects a communication partner, which is one of the communication terminals sharing the position information via the communication network within the position information sharing system 100, within a communication range of the communication terminal. For example, the server 30 transfers the position information transmitted from the mobile terminal 20 to the multiple vehicle mounted terminals 10 present within a given range from the mobile terminal 20, and also transfers the position information transmitted from the multiple vehicle mounted terminal 10 present within the given range from the mobile terminal 20 to the mobile terminal 20. With this configuration, the mobile terminal 20 can virtually perform broadcast communication with the vehicle mounted terminals 10 present around the mobile terminal 20. Herein, the given range may be set to a range in which vehicle-to-vehicle communication can be properly performed.

The above-described method of performing communication between the multiple vehicle mounted terminals 10 and the above-described method of performing communication between the vehicle mounted terminals 10 and the mobile terminal 20 are exemplary and the communication between the individual vehicle mounted terminals 10 and the communication between the vehicle mounted terminal 10 and the mobile terminal 20 are not limited to the above-described configuration. For example, the communication between the individual terminals may also be performed via a roadside device (not illustrated) used for roadside-to-vehicle communication. Also, the communication between the mobile terminal 20 and the vehicle mounted terminals 10 may be such that data is directly transmitted or received by P2P (Peer To Peer) communication. When the mobile terminal 20 has a vehicle-to-vehicle communication function (short range communication unit 132 described later), direct communication may be performed without mediation of the server 30 in a similar manner as the communication between the vehicle mounted terminals 10. That is, the server 30 is not an essential component in the position information sharing system 100. The dotted lines in FIG. 1 show the flows of signals when the vehicle mounted terminals 10 and the mobile terminal 20 perform direct communication between the terminals 10 and 20 without mediation of the server 30.

The following will describe a specific configuration of each of the terminals.

Figure 2:
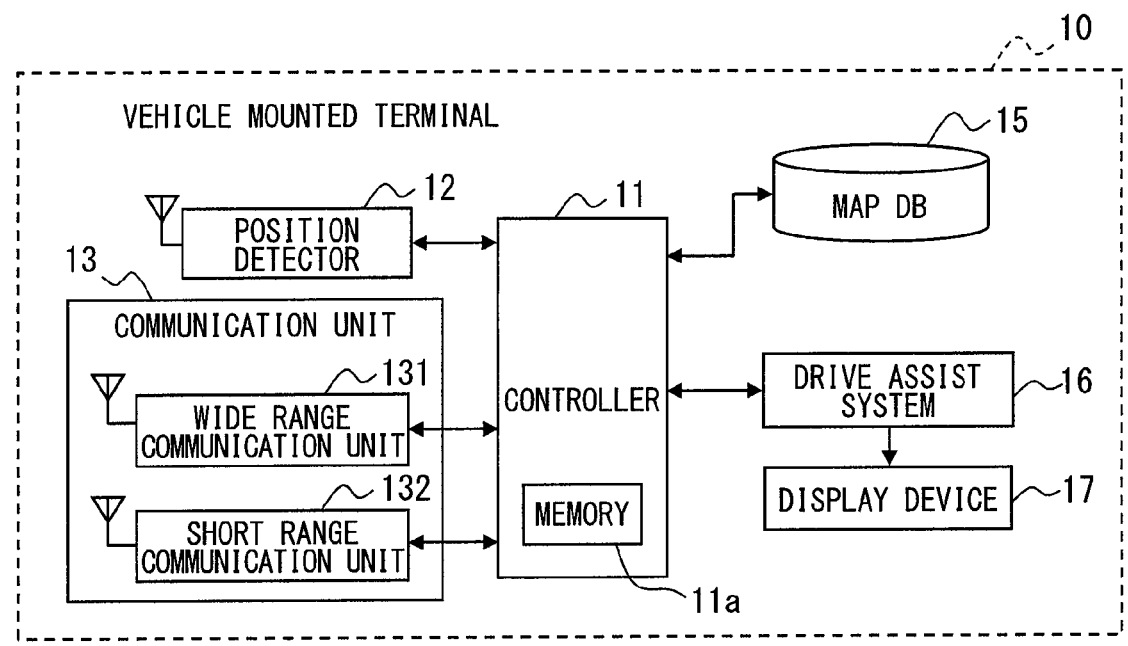
FIG. 2 is a block diagram showing an example of a schematic configuration of a vehicle mounted terminal.

As shown in FIG. 2, each of the vehicle mounted terminals 10 includes a controller 11, a position detector 12, a communication unit 13, a map database (hereinafter referred to as map DB) 15, a drive assist system 16, and a display device 17.

The position detector 12 detects the current position of the host terminal, which is the vehicle mounted terminal 10. The position detector 12 includes a satellite receiver. The satellite receiver receives radio waves transmitted from artificial satellites used in, e.g., a positioning satellite system. The position detector 12 detects the position of the host device on the basis of the radio waves received by the satellite receiver. As an example of the satellite receiver, a GPS (Global Positioning System) receiver which receives GPS waves may be used. The position information showing the current position detected by the position detector 12 is sequentially output to the controller 11. For example, the position information is represented by longitude and latitude.

The position detector 12 may also be configured to include a well-known gyro sensor and a well-known vehicle speed sensor in addition to the satellite receiver and detect the position by interpolating the data detected by each of the sensors. Besides the sensors described above, a well-known steering angle sensor or a well-known acceleration sensor may also be properly used.

The communication unit 13 includes a wide range communication unit 131 and the short range communication unit 132. The wide range communication unit 131 includes a transmission reception antenna and communicates with the server 30 and the mobile terminal 20 via a well-known communication network such as a telephone network or the Internet. It is assumed that the wire range communication unit 131 is provided by a vehicle mounted communication module such as a DCM (Data Communication Module) used in telematics communication. The wide range communication unit 131 demodulates a reception signal and outputs the reception signal to the controller 11, and at the same time, the wide range communication unit 13 modulates data inputted from the controller 11 and outputs the modulated input data. The controller 11 performs communication with another mobile terminal 20 via the wide range communication unit 131.

The short range communication unit 132 includes a transmission reception antenna and performs transmission or reception of information to or from the short range communication unit 132 included in another vehicle mounted terminal 10 by wireless communication without mediation of a communication network. That is, the short range communication unit 132 performs vehicle-to-vehicle communication. The vehicle-to-vehicle communication may be performed using, e.g., a radio wave frequency band of 700 MHz, a radio wave frequency band of 5.9 GHz, or the like. The short range communication unit 132 performs demodulation of a reception signal or the like, and at the same time, the short range communication unit 132 modulates data inputted from the controller 11 and transmits the modulated input data in broadcasting manner. That is, the controller 11 performs communication with another vehicle mounted terminal 10 via the short range communication unit 132.

The map DB 15 is a database storing map data and is provided by a rewritable nonvolatile storage medium such as, e.g., a HDD (Hard Disc Drive). The storage medium which stores the map data in the map DB 15 is not limited to a magnetic storage medium such as the HDD, but may also be an optical storage medium such as a DVD. Alternatively, the storage medium may also be a non-rewritable storage medium. The map data includes road data indicating the relation of connection between roads (i.e., road network), facility data, topography data, image data, and the like.

The road data includes node data about points (referred to as nodes) where multiple roads intersect, unite, or separate. The road data also includes link data about road segments (i.e., link) connecting the nodes. The nodes are set to the points where multiple roads intersect, are united, or separate. The nodes are also set to a point where a road comes to a dead end, a point on a road where the type of the road changes, the starting and ending points of a toll road segment, a point (point located on a boundary of adjacent blocks or areas) set for the sake of convenience in expressing a road network, and the like.

The node data includes individual data items such as node IDs which are specific numbers given to the individual nodes, the coordinates (latitude and longitude) of the nodes, node names, connection link IDs which describe the link IDs of all the links connected to the nodes, and the types of intersections.

The link data includes individual data items such as link IDs which are specific numbers given to individual roads, link lengths, the starting and ending ends of the link, coordinate data of each of points on the link, road types such as an express way or a general road, road widths, link orientations, road names, the number of traffic lanes, and limiting speeds.

The facility data is configured as data in which facilities such as a park and a shop are associated with coordinates on a map. Each of the facilities is stored together with data such as a facility name, a phone number, a facility attribute, and facility address. The facility attribute represents the attribute of the facility such as, e.g., a restaurant, a parking area, a shopping center, a park, or a sightseeing point. The topography data is data in which data about a river, a coastline, and the like are associated with coordinates on a map. The image data is data for drawing a map image or a guide image displayed in a route guidance process.

The controller 11 is provided by a typical computer and includes a well-known CPU, a nonvolatile memory such as a ROM, an EEPROM, or a flash memory, a volatile memory such as a RAM, an I/O, a bus line connecting these components (illustration of these components is omitted), and the like. The nonvolatile memory stores programs and data for performing various processes.

The controller 11 includes a memory 11a which is a rewritable storage medium and is provided by, e.g., a flash memory or the like. The memory 11a stores position information showing the current position of the host terminal and the position information of a nearby mobile object. The memory 11a also stores the mobile object type of the host terminal and terminal identifiers (hereinafter referred to as terminal IDs) for specifying a communication terminal serving as the transmission source of the received position information.

For example, when the vehicle mounted terminal 10 is used in a normal vehicle other than a construction vehicle, the mobile object type is set to the normal vehicle. When the vehicle mounted terminal 10 is used in a construction vehicle, the mobile object type may be set to the construction vehicle. The terminal ID may be a number assigned to a terminal for identification purpose. In the configuration of the present embodiment, it is assumed that the production number of a communication terminal is used as the terminal ID. The terminal ID may also be changed dynamically.

The controller 11 performs various processes on the basis of various data inputted from the position detector 12, the wide range communication unit 131, the short range communication unit 132, a position information request source 6, and the like and the programs stored in the nonvolatile memory. For example, the controller 11 provides the position information of the host terminal acquired from the position detector 12 and the position information of a nearby mobile object acquired from the wide range communication unit 131 and the short range communication unit 132 to a position information request source such as the drive assist system 16.

The drive assist system 16 performs a control operation which assists the driving operation of a driver on the basis of the position information of the host vehicle inputted from the controller 11 and the position information of the nearby mobile object. For example, the drive assist system 16 controls the display device 17 to display a nearby map image including a mark indicting the position of the nearby mobile object which is present around the host vehicle. The drive assist system 16 may determine a possibility of a collision with a nearby mobile object based on the relative positions of the host vehicle and the nearby mobile object, and alert the driver of the collision possibility.

The drive assist system 16 sequentially (e.g., every 100 milliseconds) acquires the position information of the host vehicle and the nearby mobile object from the controller 11 so as to perform the process described above. Accordingly, the drive assist system 16 corresponds to the position information request source.

The display device 17 displays a text or an image on the basis of an instruction from the drive assist system 16 and notifies to the user of various information items. For example, the display device 17 may be disposed at the center of an instrument panel, in a combination meter provided in front of a driving seat, and so forth. The display device 17 is capable of, e.g., full color display and can be configured using a liquid crystal display, an organic EL display, a plasma display, or the like.

Figure 3:
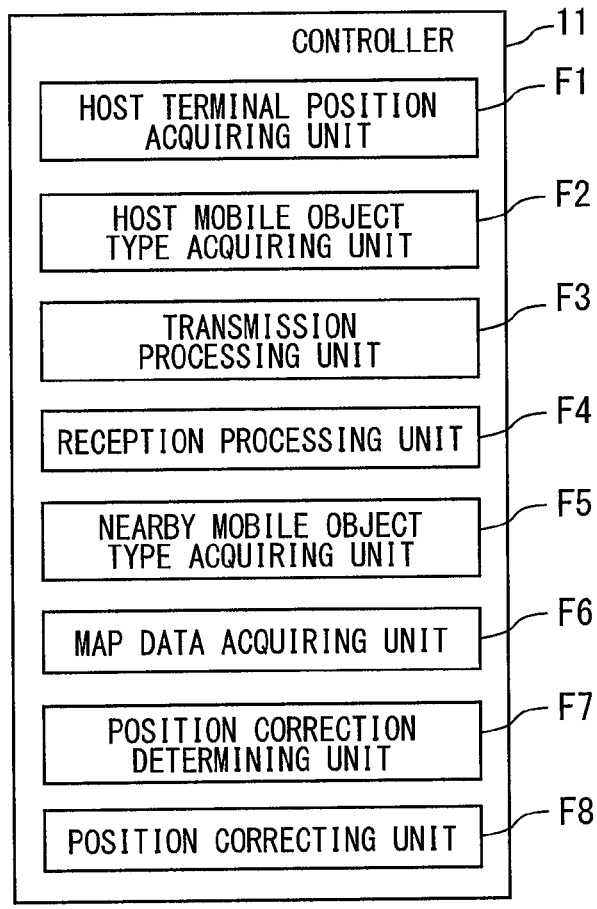
FIG. 3 is a functional block diagram showing an example of a schematic configuration of a controller included in the vehicle mounted terminal.

The following will describe various functions executed by the controller 11 with reference to FIG. 3. As shown in FIG. 3, the controller 11 includes, as functional blocks, a host terminal position acquiring unit F1, a host mobile object type acquiring unit F2, a transmission processing unit F3, a reception processing unit F4, a nearby mobile object type acquiring unit F5, a map data acquiring unit F6, a position correction determining unit F7, and a position correcting unit F8. The controller 11 and a controller 21 described later together function as a position information correcting device.

The host terminal position acquiring unit F1 sequentially acquires the position information of the host terminal sequentially detected by the position detector 12. The host terminal position acquiring unit F1 adds, to the position information acquired from the position detector 12, information indicating the time when the position information was acquired, i.e., a time stamp and stores the position information in the memory 11a.

The host mobile object type acquiring unit F2 acquires the type of the mobile object for which the host terminal is used. The host mobile object type acquiring unit F2 of the vehicle mounted terminal 10 may access the memory 11a to read out the preset mobile object type (i.e., normal vehicle) of the host terminal. It is assumed that, when the vehicle mounted terminal 10 is mounted in a construction vehicle, the mobile object type is set as a construction vehicle.

Figure 4:
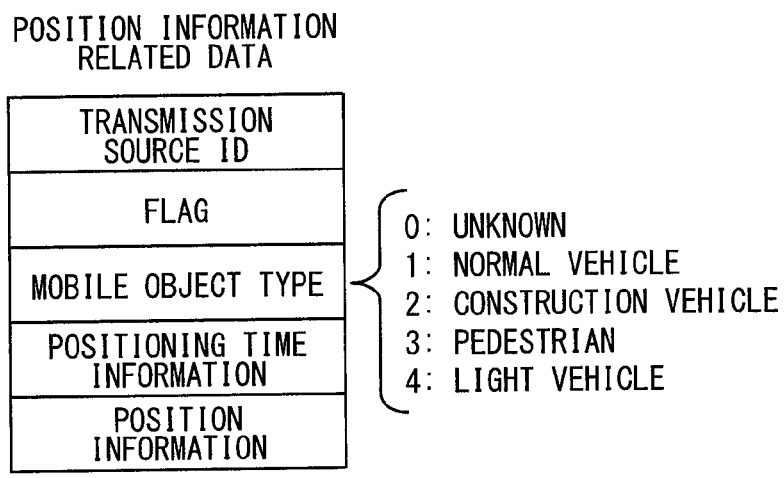
FIG. 4 is a view showing an example of a configuration of position information related data.

The transmission processing unit F3 generates position information related data including the position information acquired by the host terminal position acquiring unit F1, and transmits the position information related data from the communication unit 13 to another vehicle mounted terminal 10 or to the mobile terminal 20. Hereinafter, another vehicle mounted terminal 10 or the mobile terminal 20 may also be referred to as another communication terminal. FIG. 4 shows an example of a configuration of the position information related data generated by the transmission processing unit F3.

As shown in FIG. 4, the position information related data includes a transmission source ID, a flag, mobile object type, positioning time information, and position information. A terminal ID of the communication terminal from which the data is transmitted is inserted in the position information related data as the transmission source ID. With this configuration, the receiver can identify the transmission source of the position information related data among multiple communication terminals.

The flag indicates whether the position information included in the position information related data is corrected position information by performing a position correcting process. The position correcting process is based on the same concept as that of a well-known map matching technique as described above. Herein, the position correcting process is assumed as a process which corrects the position information of a certain mobile object using the map data such that the mobile object is present within a travelling area of a road. For instance, a flag value of zero may indicate that the position correcting process has not been performed to the position information, and a flag value of one may indicate that the position correcting process has already been performed to the position information.

The mobile object type information shows the type of the communication terminal (which is the vehicle mounted terminal 10) of the transmission source. For example, when the mobile object type is unknown, 0 may be set as the mobile object type. When the mobile object type is a normal vehicle, a construction vehicle, a pedestrian, or a light vehicle, 1, 2, 3, or 4 may be set, respectively.

The field of the positioning time information shows the time when the position information included in the position information related data is detected in the communication terminal of the transmission source. The position information acquired by the host terminal position acquiring unit F1 is stored in the field of the position information.

The position information related data may include not only the information items described above, but also travelling direction information showing a travelling direction, speed information showing a travelling speed, and the like.

The reception processing unit F4 acquires the position information related data transmitted from another communication terminal through the communication unit 13 of own communication terminal. When acquiring the position information related data, the reception processing unit F4 stores the data in the memory 11a. The position information related data is managed on transmission source ID basis and stored in the memory 11a in chronological order.

The nearby mobile object type acquiring unit F5 acquires the mobile object type of the transmission source of the position information related data acquired by the reception processing unit F4. In the present embodiment, the field of the mobile object type information in the position information related data may be referred to for identifying the mobile object type of the nearby mobile object.

The map data acquiring unit F6 acquires, from the map DB 15, map data around the current position. The range of the map data to be acquired is determined on the basis of the position information acquired by the host terminal position acquiring unit F1 and the position information of the nearby mobile object received by the reception processing unit F4. It is assumed that the range of the map data acquired from the map DB 15 covers road data and facility data of a range including the host terminal and the nearby mobile object. In the present embodiment, the map data acquiring unit F6 is configured to acquire required map data from the map DB 15, but the configuration is not limited thereto. When the vehicle mounted terminal 10 does not include the map DB 15, the map data acquiring unit F6 may also be configured to download the required map data from the communication network via the wide range communication unit 131.

The position correction determining unit F7 determines whether or not the position information needs to be corrected depending on the mobile object type of the mobile object. The position correction determining unit F7 corresponds to a correction performance determining unit. The position correcting unit F8 performs the position correcting process on the basis of the position information of each of the mobile objects, the mobile object type, and the map data acquired by the map data acquiring unit F6. The position correction determining unit F7 and the position correcting unit F8 will be described later with reference to the flowchart shown in FIG. 7.

Some or all of the functional blocks (F1 to F8) included in the controller 11 described above may also be configured using hardware such as a single or multiple ICs (Integrated Circuits).

Figure 5:
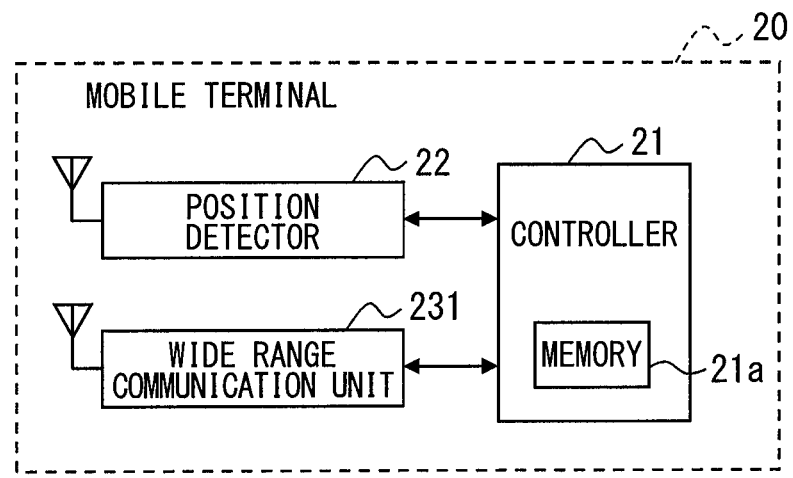
FIG. 5 is a block diagram showing an example of a schematic configuration of a mobile terminal.

The following will describe a schematic configuration of the mobile terminal 20. As shown in FIG. 5, the mobile terminal 20 includes a position detector 22, a wide range communication unit 231, and the controller 21. For the sake of simplification, a description of those of components related to the functions of a typical mobile terminal such as a smartphone, which are unnecessary for the description of the present disclosure, is omitted herein.

The position detector 22 and the wide range communication unit 231 included in the mobile terminal 20 are similar to the position detector 12 and the wide range communication unit 131 included in the vehicle mounted terminal 10, respectively.

Similarly to the controller 11 of the vehicle mounted terminal 10, the controller 21 of the mobile terminal 20 includes a host terminal position acquiring unit F1, a host mobile object type acquiring unit F2, a transmission processing unit F3, a reception processing unit F4, a nearby mobile object type acquiring unit F5, a map data acquiring unit F6, and a position correcting unit F8. The memory 21a is provided by a rewritable nonvolatile storage medium, and stores various data, similarly to the memory 11a of the vehicle mounted terminal 10. The memory 21a stores a position information sharing application for a typical mobile terminal.

The vehicle mounted terminal 10 is used in a vehicle. Thus, a possibility that the mobile object type of the vehicle mounted terminal 10 may change is relatively low. In contrast, the mobile terminal 20 is carried by the user. Thus, it is considered that the mobile object type of the mobile terminal 20 may be more dynamically changed.

Figure 6:
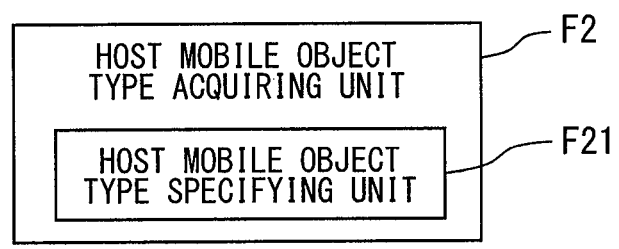
FIG. 6 is a block diagram showing a schematic configuration of a host mobile object type acquiring unit.

Accordingly, as shown in FIG. 6, the host mobile object type acquiring unit F2 included in the mobile terminal 20 includes a host mobile object type specifying unit F21 which specifies the mobile object type of the host terminal based on the time series data of the position information acquired by the host terminal position acquiring unit F1.

The host mobile object type specifying unit F21 refers to the time series data of the position information of the host terminal to determine the time series data of a moving speed. The moving speed may be calculated from the distance between two points and the time required for travelling between the two points. Then, from the time series data of the moving speed, the host mobile object type specifying unit F21 determines the mobile object type as follows.

First, when the average value of the moving speed of the transmission source is equal to or higher than a predetermined threshold (hereinafter referred to as a first speed), the host mobile object type specifying unit F21 determines that the mobile object type is the normal vehicle. The first speed may be designed to have a proper value for determining that the mobile object type is the normal vehicle based on the moving speed, and may be set to, e.g., 40 km/h. When the moving speed of the mobile object is equal to or higher than a second speed and is lower than the first speed, the host mobile object type specifying unit F21 may determine that the mobile object type is the light vehicle. The second speed has a value for distinguishing the light vehicle from a pedestrian, and may be set to, e.g., 5 km/h. The second speed may be set in accordance with the average value of walking speeds of adults. When the moving speed is lower than a second threshold, the host mobile object type specifying unit F21 may determine that the mobile object type is a pedestrian.

The foregoing has shown an example in which the host mobile object type specifying unit F21 determines the mobile object type using the average value of the moving speed of the host terminal, but the determination of the mobile object type is not limited thereto. The host mobile object type specifying unit F21 may also determine the mobile object type by comparing, with the first and second speeds, a maximum value within a given time period (e.g., 5 minutes) previous to the current time. The host mobile object type specifying unit F21 may also determine the mobile object type using dispersion or the like, instead of the average value. The host mobile object type specifying unit F21 may also determine the mobile object type by considering a moving direction together with the moving speed.

The host mobile object type specifying unit F21 may also determine the mobile object type using, in addition to the moving speed, a movement locus determined from the time series data of the position information and map data. For example, even though the average value of the moving speed is equal to or higher than the first speed, when the movement locus is similar to the shape of a rail track which is located in the vicinity, it is highly possible that the pedestrian is moving by train. Accordingly, in such a case, the host mobile object type specifying unit F21 determines that the mobile object type is the pedestrian. On the other hand, when there is no rail track in the vicinity or when the movement locus is not similar to the shape of the rail track located in the vicinity, the host mobile object type specifying unit F21 may determine that the mobile object type is the vehicle. Whether or not the movement locus is similar to the shape of the rail track may be determined using a well-known pattern matching technique.

Similar to the host mobile object type acquiring unit F2 of the mobile terminal 20, the host mobile object type acquiring unit F2 of the vehicle mounted terminal 10 may include the host mobile object type specifying unit F21.

In the present embodiment, the memory 21a of the mobile terminal 20 stores the mobile object type of the host terminal as the pedestrian. When the moving speed of the host terminal is equal to or lower than the second speed, the host mobile object type acquiring unit F2 of the mobile terminal 20 refers to the memory 21a to acquire the mobile object type of the host terminal. When the moving speed of the host terminal becomes equal to or higher than the second speed, the host mobile object type acquiring unit F2 may adopt the mobile object type specified by the host mobile object type specifying unit F21 as the mobile object type of the host terminal.

The various functional blocks included in the controller 21 operate when the position information sharing application is in operating state. Consequently, the moving owner of the mobile terminal who carries the mobile terminal 20 corresponds to a mobile object which shares the position information in the position information sharing system 100.

Similarly to the vehicle mounted terminal 10, the mobile terminal 20 sequentially transmits the position information related data including the position information detected by the position detector 22. At the same time, the mobile terminal 20 receives the position information related data transmitted from another communication terminal such as the vehicle mounted terminal 10, and stores the position information related data in the memory 21a.

Figure 7:
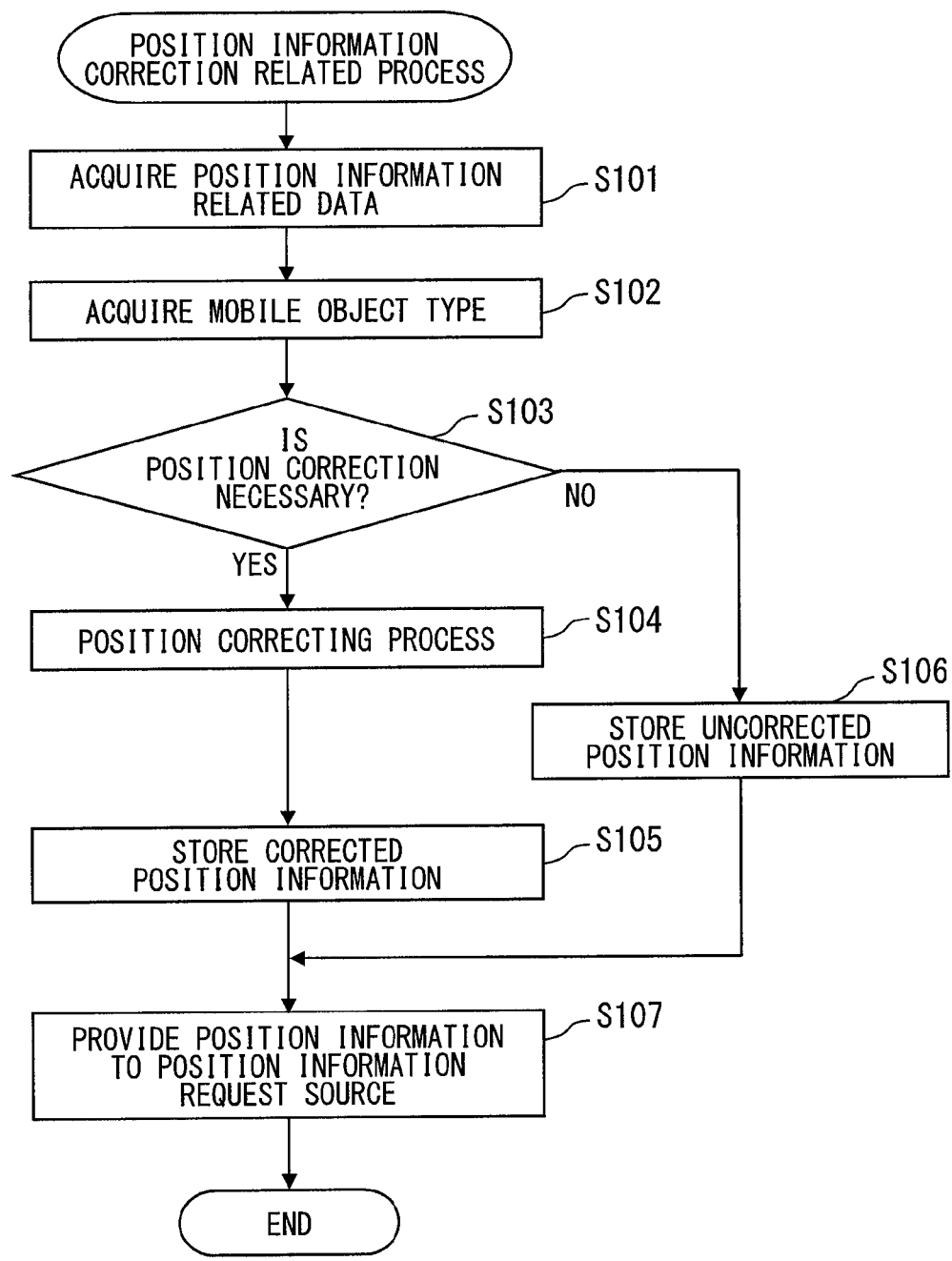
FIG. 7 is a flowchart showing an example of a flow of a position information correction related process.

The following will describe a position information correction related process performed by the controller 11 of the vehicle mounted terminal 10 with reference to the flowchart shown in FIG. 7. The flowchart shown in FIG. 7 is executed when, e.g., the position information related data is inputted from the communication unit 13. The following will describe the position information correction related process performed by the controller 11 of the vehicle mounted terminal 10. The controller 21 of the mobile terminal 20 also performs the position information correction related process in similar manner.

First, in step S101, the reception processing unit F4 acquires the position information related data received by the communication unit 13, and the process proceeds to step S102. In step S102, the nearby mobile object type acquiring unit F5 acquires the mobile object type of the nearby mobile object from the position information related data acquired in step S101. Herein, the nearby mobile object is the transmission source of the position information related data.

In step S103, the position correction determining unit F7 determines whether or not the position correcting process needs to be carried out to the position information of the nearby mobile object. For example, when the mobile object type of the nearby mobile object acquired by the nearby mobile object type acquiring unit F5 in step S102 is the normal vehicle, the position correction determining unit F7 determines that the position correcting process needs to be carried out to the position information of the nearby mobile object. On the other hand, when the mobile object type of the nearby mobile object acquired by the nearby mobile object type acquiring unit F5 in step S102 is other than the normal vehicle, the position correction determining unit F7 determines that there is no need to carry out the position correcting process to the position information of the nearby mobile object.

The following will describe the reason. Similar to a well-known map matching technique, for a normal vehicle which travels on a road, the position of the normal vehicle is properly corrected such that the position of the normal vehicle seems to be on the road. When the mobile object is the pedestrian or the construction vehicle, the mobile object does not necessarily travel on a road for the vehicle. For example, the mobile object may be present in a building such as a commercial facility, a construction site, a park, or the like. Accordingly, when the position of a mobile object other than a normal vehicle is corrected such that the position of the mobile object other than the normal vehicle seems to be present on a road for vehicle, the corrected position is displaced from a real position where the mobile object is present. For this reason, the position correction determining unit F7 determines whether or not the position correcting process needs to be performed depending on whether or not the mobile object type is the normal vehicle.

The position correction determining unit F7 may refer to the flag field of the position related information data. When the flag indicates that the position correction has already been performed, the position correction determining unit F7 may determine that there is no need to correct the position information of the nearby mobile object by performing the position correcting process. The position correction determination unit F7 may refer to the time series data of the position information of the nearby mobile object. When the position correction determination unit F7 determines that the nearby mobile object has not moved for a given time period or longer based on the time series data of the position information, the position correction determining unit F7 may determine that there is no need to correct the position information of the nearby mobile object by performing the position correcting process.

When the position correction determining unit F7 determines in step S103 that the position information of the nearby mobile object needs to be corrected by performing the position correcting process, step S103 determines YES and the process proceeds to step S104. On the other hand, when the position correction determining unit F7 determines that there is no need to correct the position information of the nearby mobile object by performing the position correcting process, step 103 determines NO and the process proceeds to step S106.

In step S104, the position correcting unit F8 performs the position correcting process to the position information of the nearby mobile object. More specifically, the position correcting unit F8 specifies the road (more specifically the link) on which the nearby mobile object is moving. When specifying the link on which the nearby mobile object is moving, the movement locus of the nearby mobile object may be used. The position information of the nearby mobile object is corrected such that the nearby mobile object seems to be present on the link. In the position correcting process, the map element, to which the position information of the nearby mobile object is corrected, is the link. It is assumed that the position of the nearby mobile object on the link is set as a nearest point on the link from the position shown by the received position information. When the process in step S104 is completed, the process proceeds to step S105. In step S105, the corrected position information is stored in association with the transmission source ID of the nearby mobile object in the memory 11a, and the process proceeds to step S107.

In step S106, the position information included in the position information related data is stored in association with the transmission source ID of the nearby mobile object in the memory 11a, and the process proceeds to step S107. That is, when step S103 determines NO, the position information of the nearby mobile object is not corrected. In step S107, the position information determined above is provided to the position information request source such as the drive assist system 16, and the process is ended.

The foregoing has described the process for the position information of the nearby mobile object, but similar process as in steps S102 to S107 may be performed for the position information of the host terminal. That is, when the host terminal is the vehicle mounted terminal 10 mounted in a normal vehicle, the position correcting process described in step S104 may be successively performed to the position information of the host terminal.

Figure 8:
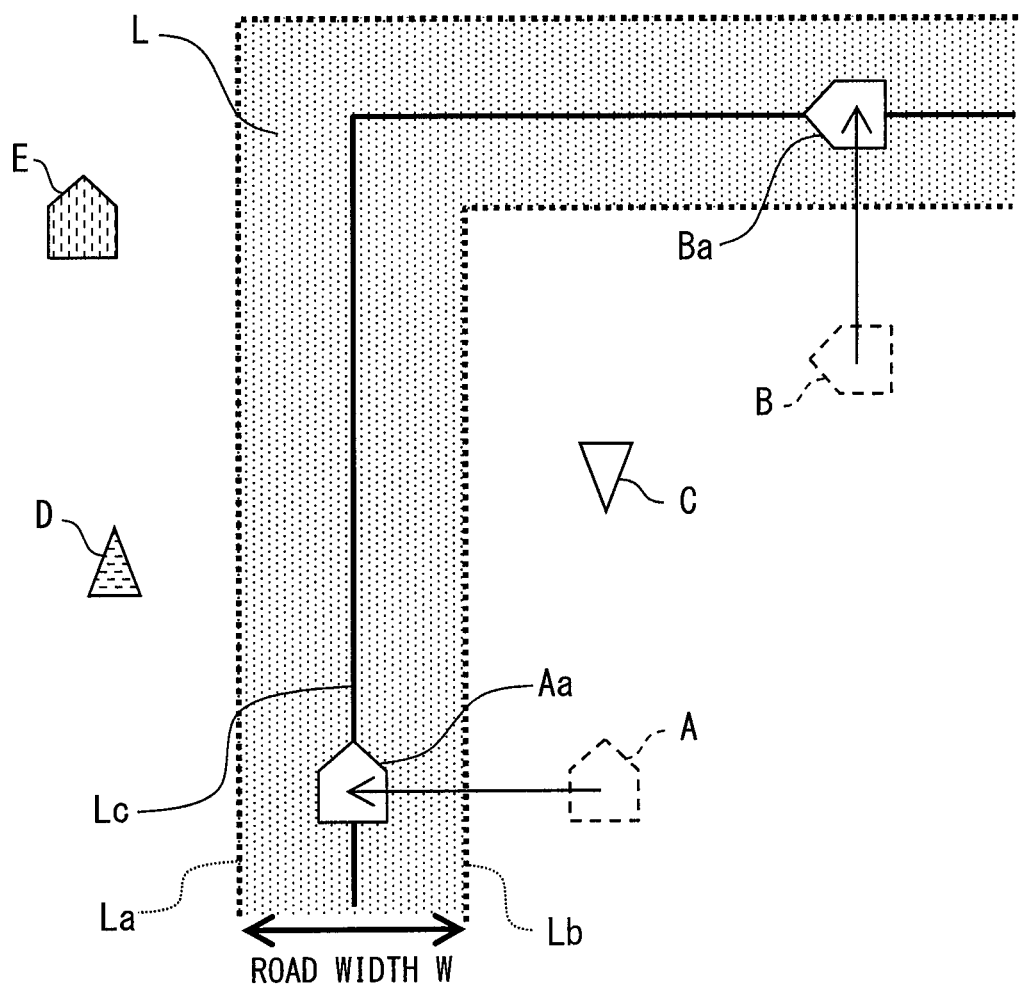
FIG. 8 is a schematic diagram illustrating the procedure of the position information correction related process.

The procedure of the foregoing position information correction related process will be described with reference to FIG. 8. In FIG. 8, symbol L denotes a road, symbol Lc denotes a line (referred to as a center line) connecting center points in longitudinal direction of the road, symbol La denotes one side end portion of the road, and symbol Lb denotes the other side end portion of the road. The center line of the road is determined by connecting the points shown by the coordinate data included in the link data. The side end portions La and Lb can be determined by connecting, when the width of the road is assumed to be W, the points each spaced apart from the road center line Lc by W/2 in a direction along road width. Each of symbols A to E is a mobile object. For example, symbol A is assumed to be a host vehicle, and symbols B to E are assumed to be the nearby mobile objects. It is assumed that symbols B, C, D, and E denote a normal vehicle, a pedestrian, a light vehicle, and a construction vehicle, respectively.

First, the controller 11 performs the position correcting process on the host vehicle A. The host vehicle after the position correcting process is denoted by symbol Aa. That is, the position information of the host vehicle A is corrected such that the host vehicle A seems to be present on a road L. Since the mobile object type of the nearby vehicle B is also the normal vehicle (step S103: YES), the position information is corrected such that the nearby vehicle B seems to be present on the road L (step S104). The position of the vehicle B after the position correcting process is denoted by symbol Ba. On the other hand, the mobile object type of each of the pedestrian C, the light vehicle D, and the construction vehicle E is not the normal vehicle (NO in step S103), the controller 11 does not perform the position correcting process to the position information of the pedestrian C, the light vehicle D, and the construction vehicle E. Accordingly, the controller 11 provides the position information included in the received position information related data directly to the position information request source.

In the foregoing configuration, when the position correction determining unit F7 determines that the position information of the nearby mobile object needs to be corrected depending on the mobile object type, the position correcting unit F8 corrects the position information of the target nearby mobile object using map data. On the other hand, when the position correction determining unit F7 determines that the position information of the nearby mobile object needs not to be corrected depending on the mobile object type, the position correcting unit F8 does not correct the position information of the nearby mobile object.

In general, a possibility that a vehicle is present at a place other than a road is relatively low. In contrast, a pedestrian or the like has the possibility of being present at a place other than a road, such as a sidewalk along a road, a facility, a park, or the like. That is, when the position information transmitted from a pedestrian is corrected such that the pedestrian seems to be present on a road, even though the pedestrian is not on the road, the position information of the pedestrian is corrected such that the pedestrian seems to be present on the road.

Accordingly, the present embodiment is configured such that the position correction determining unit F7 determines that the correction needs not to be performed when mobile object type of a nearby mobile object is the pedestrian. In this case, the position correcting unit F8 does not perform the position correcting process to the position information received from a nearby mobile object whose mobile object type is pedestrian. Since the position correcting unit F8 is configured not to perform the position correcting process to the position information transmitted from a pedestrian such that the pedestrian seems to be present on a road, the position information of the pedestrian is not corrected by the position correcting process such that the pedestrian seems to be present on a road. Mobile objects each having the possibility of being present outside a road may include a pedestrian, a light vehicle, a construction vehicle, and the like. To such kind of mobile object also, the position correcting unit F8 does not perform the position correcting process such that the mobile object seems to be present on a road. As a result, the position information is not corrected by the position correcting process such that the mobile object seems to be present on a road.

As described above, the position correcting unit does not correct the position information of the target when the position correction determining unit F7 has determined that the position information of the target needs not to be corrected depending on the mobile object type of the transmission source of the position information. Thus, it is possible to reduce the possibility that position information of a mobile object which is not present on a road is corrected seems to be present on the road.

While the embodiment of the present disclosure has been described heretofore, the present disclosure is not limited to the embodiment described above. The following embodiments are also included in the technical scope of the present disclosure. In addition, various changes and modifications other than those shown below can be made in the present disclosure, which can be implemented within a scope not departing from the gist thereof.

(First Modification)

In the foregoing embodiment, the position information related data includes the mobile object type. More specifically, that the transmission side communication terminal includes the host mobile object type acquiring unit F2 and transmits the mobile object type of the host terminal acquired by the host mobile object type acquiring unit F2 to the receiving side communication terminal. The present disclosure is not limited to this configuration.

Figure 9:
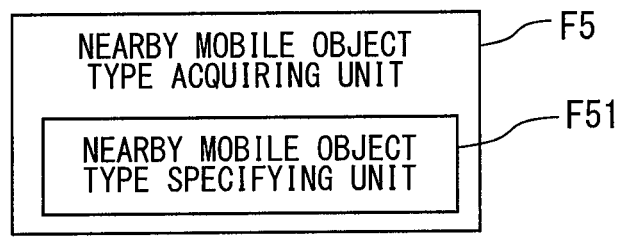
FIG. 9 is a block diagram showing a schematic configuration of a nearby mobile object type acquiring unit in a first modification of the present disclosure.

In a first modification, instead of the transmitting end communication terminal, the receiving end communication terminal specifies the mobile object type. Specifically, as shown in FIG. 9, the nearby mobile object type acquiring unit F5 includes a nearby mobile object type specifying unit F51 which specifies the mobile object type of the nearby mobile object serving as the transmission source of the received position information or the like. The following will describe the nearby mobile object type specifying unit F51. Similar concept as that of the host mobile object type specifying unit F21 described previously can be applied to the nearby mobile object type specifying unit F51.

First, the nearby mobile object type specifying unit F51 specifies the transmission source ID of the nearby mobile object included in the received time position information related data. Then, the nearby mobile object type specifying unit F51 refers to the time series data of the position information of the nearby mobile object corresponding to the specified transmission source ID, and acquires series data of a moving speed of the nearby mobile object. When the received position information related data includes the moving speed of the nearby mobile object, the moving speed included in the received position information related data may be directly used.

Then, when the average value of the moving speeds of the nearby mobile object is equal to or higher than the first speed, the nearby mobile object type specifying unit F51 determines that the mobile object type of the nearby mobile object is the normal vehicle. When the average value of the moving speeds of the nearby mobile object is equal to or higher than the second speed and is lower than the first speed, the nearby mobile object type specifying unit F51 determines that the mobile object type of the nearby mobile object is the light vehicle. When the moving speed is lower than the second speed, the nearby mobile object type specifying unit F51 determines that the mobile object type is the pedestrian.

In the above-described example, the nearby mobile object type specifying unit F51 specifies the mobile object type using the average value of the moving speeds of the nearby mobile object. The specification of the mobile object type is not limited thereto. The nearby mobile object type specifying unit F51 may also determine the mobile object type by comparing a maximum value in the time series data of the moving speed with the first and second speeds. Alternatively, the nearby mobile object type specifying unit F51 may also determine the mobile object type using not only the average value and the maximum value, but also a medium value, dispersion, or the like. The nearby mobile object type specifying unit F51 may also determine the mobile object type in consideration of not only the moving speed, but also the moving direction.

Alternatively, the nearby mobile object type specifying unit F51 may also determine the mobile object type of the nearby mobile object from a movement locus determined from the time series data of the position information and map data. For example, when the average value of the moving speed is equal to or higher than the first speed and the movement locus is similar to a shape of a rail track present in the vicinity, the nearby mobile object type specifying unit F51 may determine that the mobile object type is a pedestrian. On the other hand, when there is no rail track or the like in the vicinity or the movement locus is not similar to the shape of the rail track present in the vicinity, the nearby mobile object type specifying unit F51 may determine that the mobile object type is the normal vehicle.

With the above-described configuration, even when the position information related data does not include information indicating the mobile object type of the transmission source or when the field of the mobile object type in the position information related data is set to 0 (i.e., unknown), the nearby mobile object type acquiring unit F5 can acquire the mobile object type of the nearby mobile object.

In addition, in a configuration where the mobile object type is not transmitted from the transmission source, the amount of communication between communication terminals can be reduced. The communication capacity usable for vehicle-to-vehicle communication is limited and the size of data transmitted or received by the vehicle-to-vehicle communication is also limited (or fixed). Regarding such a background, in an example where the mobile object type is transmitted separate from the position information, the size of the communication data capacity may become insufficient. The vehicle-to-vehicle communication is designed to assign communication capacity to transmission source ID and the position information. Thus, when the mobile object type is specified at the receiving end without being transmitted from the transmitting end, there is no concern about a shortage of communication capacity for the mobile object type data.

As described above, in the present modification, the communication terminal of the nearby mobile object does not transmit the mobile object type of the nearby mobile object and the receiving end communication terminal specifies the mobile object type of the transmission source. With this configuration, it is possible to more efficiently use the communication capacity and more smoothly implement the position information sharing system 100.

(Second Modification)

In a second modification, the nearby mobile object type acquiring unit F51 (see FIG. 9) may be provided similar to the first modification even though the mobile object type is included in the position information related data transmitted from the transmission source as the above-described embodiment. Further, the receiving end communication terminal may compare the mobile object type indicated by the mobile object type information of the position information related data with the mobile object type specified by the nearby mobile object type specifying unit F51, and the position correction determining unit F7 determines whether to permit a use of the mobile object type information included in the position information related data based on the comparing result.

For example, in a case where the mobile object type indicated by the mobile object type information of the position information related data is different from a real mobile object type, the nearby mobile object whose position information should be corrected to seem to be present on the road may become non-target of the position correction process.

As an example of the mobile object type shown by the mobile object type information of the position information related data is different from a real mobile object type, the following case will be considered. When a mobile object, which is a construction purpose vehicle to be used in a construction site, is travelling on a road, the vehicle should be determined as a normal vehicle so that the vehicle is to be determined as a target of the position correcting process. In this case, when the received mobile object type information is used, the vehicle is determined to be the construction vehicle but not the normal vehicle. Thus, the vehicle is not determined as a target of the position correcting process.

In general, a possibility that the construction vehicle travels within a construction site at a speed of equal to or higher than the first speed is low. When a mobile object whose mobile object type is the construction vehicle is moving at a speed of equal to or higher than the first speed, it is highly possible that the mobile object is travelling on a road. When the mobile object is moving at a speed of equal to or higher than the first speed, the nearby mobile object type specifying unit F51 may determine that the mobile object type is a normal vehicle.

The position correction determining unit F7 can obtain more appropriate position information by determining whether or not position correction needs to be performed using the result specified by the nearby mobile object type specifying unit F5 instead of the mobile object type indicated by the mobile object time information.

When the mobile object type indicated by the mobile object type information of the position information related data does not match the result specified by the nearby mobile object type specifying unit F51, the mobile object type may be set to unknown. This can reduce a possibility that the position correcting process may erroneously be performed.

When the mobile object type shown by the mobile object type information of the position information related data matches the result specified by the nearby mobile object type specifying unit F51, it can be determined that the content of the mobile object type information of the position information related data is credible.

(Third Modification)

In the foregoing embodiments and modifications, the position correcting unit F8 is configured to perform the position correcting process only for a nearby mobile object whose mobile object type is the normal vehicle. The configuration of the position correcting unit F8 is not limited thereto. The reason for using the configuration which performs the position correcting process only for a nearby mobile object whose mobile object type is the normal vehicle is that the position of the nearby mobile object after being corrected by the position correcting process is a road. That is, when the position information of the mobile object which should intrinsically be on a road shows a point outside of the road, the position correcting process is performed as a procedure for eliminating the resulting contradiction.

In the third modification, the position correcting unit F8 corrects a position of the nearby mobile object to a map element other than the road. Specifically, for different types of nearby mobile objects, the position correcting unit F8 corrects the positions of the nearby mobile objects to different map elements corresponding to the mobile object types of the nearby mobile objects. As will be described later, the map elements mentioned herein may include a center portion of a road, a side end portion of the road, a facility such as a park, or the like.

Figure 10:
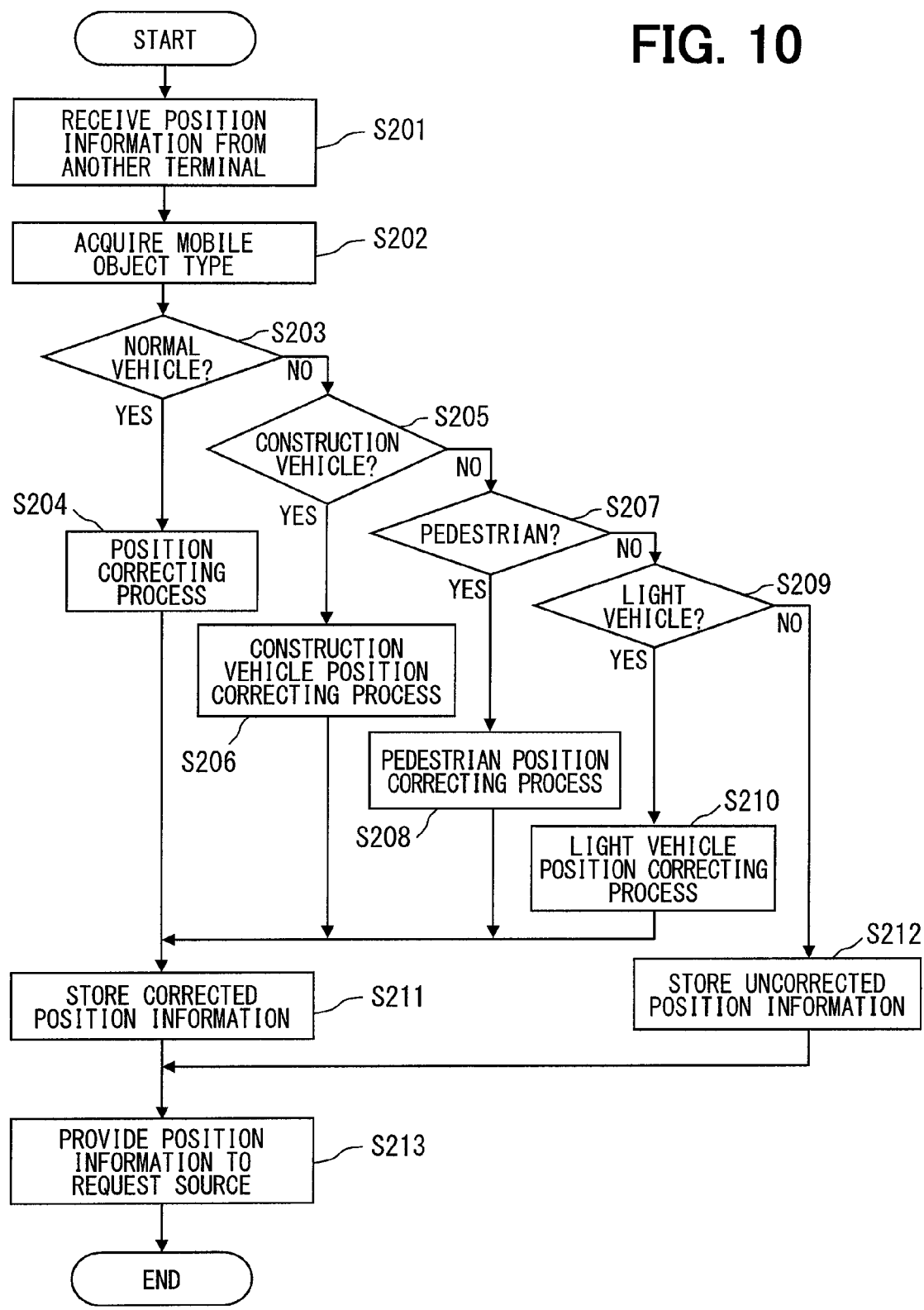
FIG. 10 is a flowchart showing an example of the flow of the position information correction related process in a third modification of the present disclosure.

The following will describe a position information correction related process performed by the controller 11 in the third modification with reference to the flowchart shown in FIG. 10. The flowchart shown in FIG. 10 is performed when, e.g., the position information related data is inputted to the controller 11 from the communication unit 13. The description will be given herein of the position information correction related process performed by the controller 11 of the vehicle mounted terminal 10, but the position information correction related process shown in FIG. 10 may also be performed by the controller 21 of the mobile terminal 20.

First, in step S201, the reception processing unit F4 acquires the position information related data received by the communication unit 13, and the process proceeds to step S202. In step S202, the nearby mobile object type acquiring unit F5 acquires the mobile object type of the nearby mobile object based on the position information related data acquired in step S201. Herein, the nearby mobile object is the transmission source of the position information related data.

In step S203, the position correction determining unit F7 determines whether or not the mobile object type of the nearby mobile object acquired by the nearby mobile object type acquiring unit F5 in S202 is the normal vehicle. When the mobile object type of the nearby mobile object is the normal vehicle, step S203 determines YES, and the process proceeds to step S204. On the other hand, when the mobile object type of the nearby mobile object is not the normal vehicle, step S203 determines NO, and the process proceeds to step S205.

In step S204, similar to step S104 in FIG. 7, the position correcting unit F8 specifies the road on which the nearby mobile object is travelling based on the position information of the nearby mobile object and map data, and corrects the position information of the nearby mobile object such that the nearby mobile object seems to be present at the center portion of the road. The center portion of the road may be a point shown by the coordinate data included in the link data. The position of the nearby mobile object on the road may be a point in the coordinate data showing the shape of the road which is nearest from the position shown by the received position information. When the process in step S204 is completed, the process proceeds to step S211.

In step S205, the position correction determination unit F7 determines whether or not the mobile object type of the nearby mobile object acquired by the nearby mobile object type acquiring unit F5 in step S202 is a construction vehicle. When the mobile object type of the nearby mobile object is a construction vehicle, S205 determines YES, and the process proceeds to step S206. On the other hand, when the mobile object type of the nearby mobile object is not a construction vehicle, step S205 determines NO, and the process proceeds to step S207.

In step S206, the position correcting unit F8 performs a construction vehicle position correcting process, and the process proceeds to S211. In the construction vehicle position correcting process in step S206, the road on which the nearby mobile object is moving is specified from the position information of the nearby mobile object and the map data. Then, the position correcting unit F8 corrects the position information of the nearby mobile object such that the nearby mobile object seems to be present on the side end portion of the road. The side end portion of the road may be a point apart from the center line of the road by a distance corresponding to half of the road width in a direction perpendicular to the road extension direction toward the position where the nearby mobile object is present.

For example, the position correcting unit F8 specifies link coordinates nearest from the point shown by the received position information and corrects the position information of the nearby mobile object so that the position of the nearby mobile object after being corrected is at a point apart from the link coordinates by a distance corresponding to half of the road width in the direction toward the position where the nearby mobile object is present.

In step S207, the position correction determining unit F7 determines whether or not the mobile object type of the nearby mobile object acquired by the nearby mobile object type acquiring unit F5 in step S202 is a pedestrian. When the mobile object type of the nearby mobile object is a pedestrian, step S207 determines YES, and the process proceeds to step S208. On the other hand, when the mobile object type of the nearby mobile object is not a pedestrian, step S207 determines NO, and the process proceeds to step S209.

In step S208, the position correcting unit F8 performs a pedestrian position correcting process, and the process proceeds to step S211. In the pedestrian position correcting process in step S208, from the position information of the nearby mobile object and the map data, a nearest road which is a road nearest from the point shown by the position information of the nearby mobile object is specified. In addition, from the position information of the nearby mobile object and the map data, a pedestrian area (referred to as the nearest pedestrian area) nearest from the point shown by the position information of the nearby mobile object is specified. The pedestrian area mentioned herein is an area outside a road which has a relatively high possibility of a pedestrian being present in the area, such as a park or a building. A map element representing a pedestrian area may be properly defined.

Then, a comparison is made between the distance from the point shown by the position information of the nearby mobile object to the nearest road and the distance from the point shown by the position information of the nearby mobile object to the nearest pedestrian area. As a result of the comparison, when the distance from the point shown by the position information of the nearby mobile object to the nearest pedestrian area is shorter, the position correcting unit F8 corrects the position information such that the nearby mobile object seems to be present in the nearby pedestrian area.

On the other hand, when the distance from the point shown by the position information of the nearby mobile object to the nearest road is equal to or shorter than the distance from the point to the nearest pedestrian area, the position correcting unit F8 corrects the position information such that the nearby mobile object seems to be present on a side end portion of the nearest road. In this case, for the nearby mobile object having the mobile object type of pedestrian, a method of determining the display position after correction is similar to the case where the nearby mobile object is the construction vehicle.

In step S209, the position correction determining unit F7 determines whether or not the mobile object type of the nearby mobile object acquired by the nearby mobile object type acquiring unit F5 in step S202 is a light vehicle. When the mobile object type of the nearby mobile object is a light vehicle, step S209 determines YES, and the process proceeds to step S210. On the other hand, when the mobile object type of the nearby mobile object is not a light vehicle, step S209 determines NO, and the process proceeds to step S212.

In step S210, the position correcting unit F8 performs a light vehicle position correcting process, and the process proceeds to step S211. In the light vehicle position correcting process in step S210, from the position information of the nearby mobile object and the map data, a road on which the nearby mobile object is moving is specified. Then, the position information of the nearby mobile object is corrected to show that the nearby mobile object is present on a side end portion of the road. In this case, for the nearby mobile object having the mobile object type of light vehicle, a method of determining the display position after correction is similar to the case where the nearby mobile object is the construction vehicle.

In step S211, the corrected position information is stored in association with the transmission source ID of the nearby mobile object in the memory 11a, and the process proceeds to step S213.

In step S212, the position information included in the position information related data is stored in association with the transmission source ID in the memory 11a, and the process proceeds to step S213.

In step S213, the position information determined as the above is provided to the position information request source of the drive assist system 16 or the like, and the flow is ended.

Figure 11:
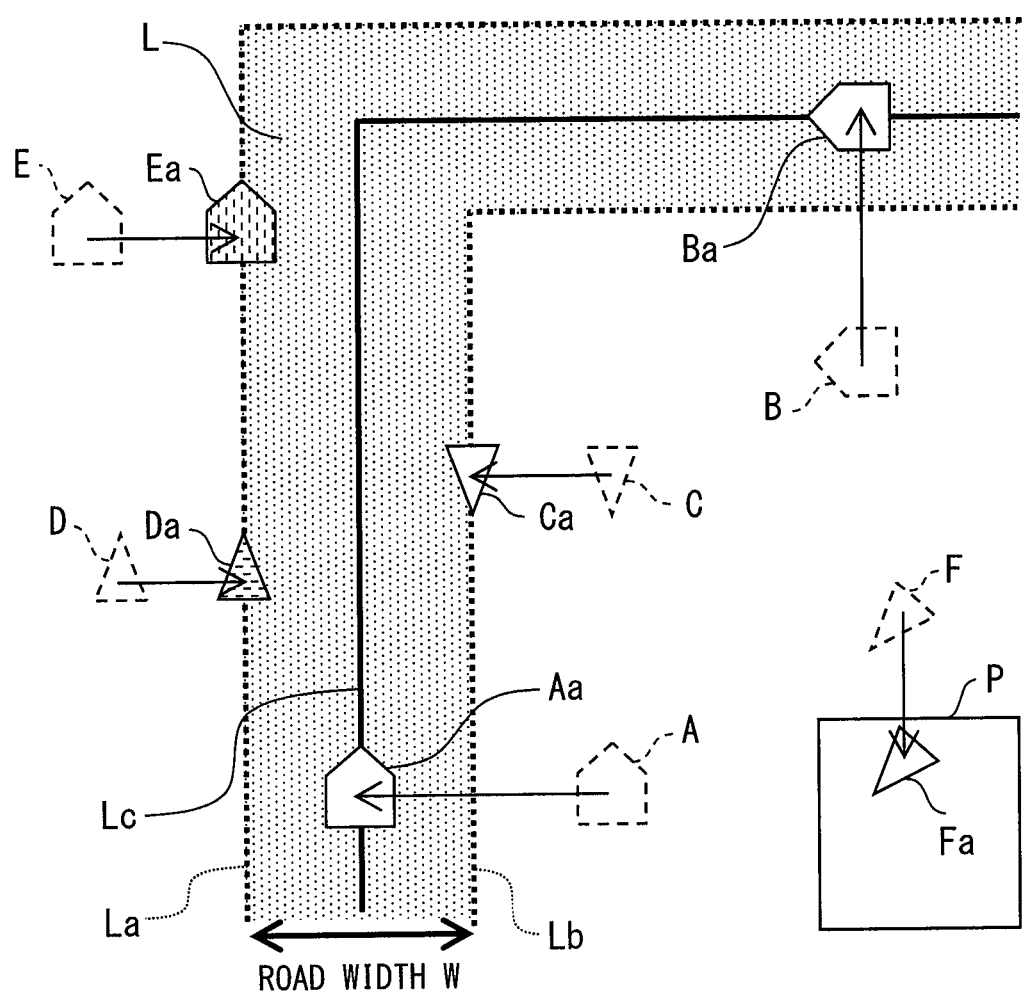
FIG. 11 is a schematic diagram for illustrating the procedure of the position information correction related process in the third modification of the present disclosure.

The procedure of the foregoing position information correction related process in the third modification will be described with reference to FIG. 11. FIG. 11 is a view corresponding to FIG. 8 described in the foregoing embodiment. The elements denoted by the individual reference symbols in FIG. 11 are the same as in FIG. 8. The newly added symbol "F" denotes a pedestrian, similarly to symbol "C". Symbol "P" denotes a pedestrian area (e.g., park). It is assumed that, for each of the pedestrians C and F, a nearest road is the road L and a nearest pedestrian area is the pedestrian area P.

The position correcting unit F8 performs the position correcting process on each of the host vehicle A and the nearby vehicle B to correct the positions of the individual mobile objects to positions Aa and Ba similar to the same above-described embodiment.

The controller 11 performs the pedestrian position correcting process for each of the pedestrians C and F. In the case of the pedestrian C, the road L is at a position closer to the pedestrian C than the pedestrian area P. Accordingly, the position correcting unit F8 corrects the position information of the pedestrian C such that the pedestrian C seems to be present on the side end portion Lb of the road L, as shown by symbol Ca. Among the side end portions La and Lb of the road L, the closer side end portion for the pedestrian C is the side end portion Lb. Accordingly, it is assumed the pedestrian C is present on the side end portion Lb and the display position after correction is set as the side end portion Lb, not the side end portion La.

On the other hand, the pedestrian area P is present at a position closer to the pedestrian F than the road L. Accordingly, the position correcting unit F8 corrects the position information of the pedestrian F such that the pedestrian F seems to be present in the pedestrian area P, as shown by symbol Fa.

The position correcting unit F8 further performs the light vehicle position correcting process to the light vehicle D for correcting the position information of the light vehicle D such that the light vehicle D seems to be present on the side end portion La of the road L, as shown by symbol Da. The position correcting unit F8 also performs a construction vehicle position correcting process to the construction vehicle E for correcting the position information of the construction vehicle E such that the construction vehicle E seems to be present on the side end portion La of the road L, as shown by symbol Ea.

The third modification achieves the same effect as achieved by each of the foregoing embodiment and modifications. In addition, the third modification achieves the following effect. In the configuration of the third modification described above, the position information of a nearby mobile object whose mobile object type is the pedestrian is corrected such that the nearby mobile object seems to be present on the map element closer to the nearby mobile object on the basis of the received position information. Herein, the map element set as the display position after correction is either the side end portion of the nearest road or the nearest pedestrian area.

It is assumed herein that the pedestrian whose display position after correction is the road side end portion is actually on a sidewalk. However, it is possible that such a pedestrian is actually present on a road or is present on a sidewalk and runs onto a road in the next moment. That is, a pedestrian whose display position after correction is a road side end portion has the collision possibility with the vehicle.

On the other hand, a pedestrian whose display position after correction is a pedestrian area is assumed to be present at a point apart from a road. This means that the possibility that such a pedestrian has a relatively low collision possibility with the vehicle compared with the pedestrian whose display position after correction is a road side end portion.

That is, for a nearby mobile object whose mobile object type is the pedestrian, the display position after correction of the nearby mobile object is changed in accordance with the distances from the nearby mobile object to the nearest road and to the nearest pedestrian area. Thus, it is possible to distinguish a pedestrian having a higher collision possibility with a vehicle from a pedestrian having a lower collision possibility with a vehicle. When, e.g., the drive assist system 16 displays the position of the nearby mobile object using the corrected position information, a driver can recognize the presence of a pedestrian having the possibility of coming into contact with the host vehicle in the vicinity by confirming the display device 17.

In the present modification, it is assumed that, in the construction vehicle correcting process, the display position after correction of the nearby mobile object whose mobile object type is the construction vehicle is set as the side end portion of the road. However, the construction vehicle correcting process is not limited thereto. The controller 11 may preliminarily acquire information about a construction site around the current position of the host terminal from a server 30 or the like, and the position correcting unit F8 may specify a construction site (referred to as a nearest construction site) which is nearest from the point shown by the pre correction position information of the nearby mobile object whose mobile object type is the construction vehicle. Then, the position correcting unit F8 may compare the distance from the point shown by the pre correction position information to the nearest road to the distance from the point shown by the pre correction position information to the nearest construction site, and select the map element closer to the nearby mobile object as the display position after correction.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A position information correcting device comprising:
a reception processing unit that receives position information transmitted from a nearby mobile object;
a position correcting unit that performs a position correcting process for correcting, based on map data, the position information of the nearby mobile object such that a corrected position of the nearby mobile object is on a running area of a road;
a nearby mobile object type acquiring unit that acquires a mobile object type of the nearby mobile object; and
a correction performance determining unit that determines whether the position correcting process needs to be performed to the position information of the nearby mobile object, wherein
the reception processing unit receives, from the nearby mobile object, mobile object type information which indicates the mobile object type of the nearby mobile object, and the nearby mobile object type acquiring unit acquires the mobile object type of the nearby mobile object from the mobile object type information received by the reception processing unit,
the nearby mobile object type acquiring unit includes a nearby mobile object type specifying unit that specifies the mobile object type of the nearby mobile object based on a moving speed of the nearby mobile object,
the correction performance determining unit compares the mobile object type of the nearby mobile object indicated by the mobile object type information received by the reception processing unit with the mobile object type of the nearby mobile object specified by the nearby mobile object type specifying unit, and determines whether the position correcting process needs to be performed based on a comparison result of the two mobile object types acquired by the nearby mobile object type acquiring unit,
the position correcting unit performs the position correcting process to the position information of the nearby mobile object when the correction performance determining unit determines that the position correcting process needs to be performed, and
the position correcting unit does not perform the position correcting process to the position information of the nearby mobile object when the correction performance determining unit determines that the position correcting process need not be performed.

2. The position information correcting device according to claim 1, wherein
the nearby mobile object type specifying unit determines that the mobile object type of the nearby mobile object is a vehicle when the moving speed of the nearby mobile object is equal to or higher than a first speed, and
the first speed is set to a predetermined value which enables a determination of the mobile object type as the vehicle.

3. The position information correcting device according to claim 2, wherein
the nearby mobile object type specifying unit determines that the mobile object type of the nearby mobile object is a pedestrian when the moving speed of the nearby mobile object is lower than a second speed, and
the second speed is set to a predetermined value which enables a determination of the mobile object type as the pedestrian.

4. The position information correcting device according to claim 1,
wherein the position correcting unit changes, corresponding to the mobile object type of the nearby mobile object, a map element which is to be set as the corrected position of the nearby mobile object.

5. The position information correcting device according to claim 4, wherein,
when the mobile object type of the nearby mobile object is a normal vehicle, the position correcting unit corrects the position information of the nearby mobile object such that the corrected position of the nearby mobile object is at a center portion of the road in a road width direction, and
when the mobile object type of the nearby mobile object is a construction vehicle, the position correcting unit corrects the position information of the nearby mobile object such that the corrected position of the nearby mobile object is at a side end portion of the road.

6. The position information correcting device according to claim 4,
wherein, when the mobile object type of the nearby mobile object is a pedestrian, the position correcting unit performs a pedestrian position correcting process for correcting the position information of the nearby mobile object such that the corrected position of the nearby mobile object is at the side end portion of the road or outside of the road.

7. The position information correcting device according to claim 6, wherein,
in the pedestrian position correcting process, the position correcting unit:
refers to the map data to acquire a closest road, which is a road closest to a mobile object position indicated by the position information of the nearby mobile object, and a pedestrian area closest to the mobile object position;
corrects the position information of the nearby mobile object such that the corrected position of the nearby mobile object is in the pedestrian area when a distance between the mobile object position and the pedestrian area is shorter than a distance between the mobile object position and the closest road; and
corrects the position information of the nearby mobile object such that the corrected position of the nearby mobile object is at the side end portion of the closest road which is closer to the nearby mobile object when the distance between the mobile object position and the pedestrian area is equal to or longer than the distance between the mobile object position and the closest road.

8. The position information correcting device according to claim 1, further comprising:
a host terminal position acquiring unit that acquires position information of a host terminal;
a host mobile object type acquiring unit that acquires a mobile object type of a mobile object for which the host terminal is used; and
a transmission processing unit that transmits the position information acquired by the host terminal position acquiring unit and mobile object type information indicating the mobile object type acquired by the host mobile object type acquiring unit.

9. A position information correcting application program product stored in a computer readable non-transitory tangible storage medium and comprising instructions to be executed by a computer, the instructions for implementing:

receiving position information transmitted from a nearby mobile object;

performing a position correcting process for correcting, based on map data, the position information of the nearby mobile object such that a corrected position of the nearby mobile object is on a running area of a road;

receiving mobile object type information from the nearby mobile object;

acquiring a mobile object type of the nearby mobile object indicated by the mobile object type information that is received;

specifying a mobile object type of the nearby mobile object based on a moving speed of the nearby mobile object;

comparing the mobile object type that is indicated by the mobile object type information with the mobile object type that is specified based on the moving speed of the nearby mobile object;

determining, based on a comparison result of the mobile object type that is indicated by the mobile object type information with the mobile object type that is specified based on the moving speed of the nearby mobile object, whether the position correcting process needs to be performed to the position information of the nearby mobile object;

performing the position correcting process to the position information of the nearby mobile object when determining that position correcting process needs to be performed; and not performing the position correcting process to the position information of the nearby mobile object when determining that the position correcting process need not be performed.

10. A position information correcting device comprising:

a reception processing unit that receives position information transmitted from a nearby mobile object;

a position correcting unit that performs a position correcting process for correcting, based on map data, the position information of the nearby mobile object;

a nearby mobile object type acquiring unit that acquires a mobile object type of the nearby mobile object; and a correction performance determining unit that determines, based on the mobile object type acquired by the nearby mobile object type acquiring unit, whether the position correcting process needs to be performed to the position information of the nearby mobile object, wherein the position correcting unit changes, corresponding to the mobile object type of the nearby mobile object, a map element which is to be set as a corrected position of the nearby mobile object, when the mobile object type of the nearby mobile object is a normal vehicle, the position correcting unit corrects the position information of the nearby mobile object such that the corrected position of the nearby mobile object is at a center portion of the road in a road width direction, when the mobile object type of the nearby mobile object is a construction vehicle, the position correcting unit corrects the position information of the nearby mobile object such that the corrected position of the nearby mobile object is at a side end portion of the road, the position correcting unit performs the position correcting process to the position information of the nearby mobile object when the correction performance determining unit determines that the position correcting process needs to be performed, and the position correcting unit does not perform the position correcting process to the position information of the nearby mobile object when the correction performance determining unit determines that the position correcting process need not be performed.

11. The position information correcting device according to claim 10, wherein the reception processing unit receives, from the nearby mobile object, mobile object type information which indicates the mobile object type of the nearby mobile object, and the nearby mobile object type acquiring unit acquires the mobile object type of the nearby mobile object from the mobile object type information received by the reception processing unit.

12. The position information correcting device according to claim 10, wherein the nearby mobile object type acquiring unit includes a nearby mobile object type specifying unit that specifies the mobile object type of the nearby mobile object based on a moving speed of the nearby mobile object.

13. The position information correcting device according to claim 12, wherein the nearby mobile object type specifying unit determines that the mobile object type of the nearby mobile object is a vehicle when the moving speed of the nearby mobile object is equal to or higher than a first speed, and the first speed is set to a predetermined value which enables a determination of the mobile object.type as the vehicle.

14. The position information correcting device according to claim 13, wherein the nearby mobile object type specifying unit determines that the mobile object type of the nearby mobile object is a pedestrian when the moving speed of the nearby mobile object is lower than a second speed, and the second speed is set to a predetermined value which enables a determination of the mobile object type as the pedestrian.

15. The position information correcting device according to claim 10, wherein, when the mobile object type of the nearby mobile object is a pedestrian, the position correcting unit performs a pedestrian position correcting process for correcting the position information of the nearby mobile object such that the corrected position of the nearby mobile object is at the side end portion of the road or outside of the road.

16. The position information correcting device according to claim 15, wherein, in the pedestrian position correcting process, the position correcting unit:

refers to the map data to acquire a closest road, which is a road closest to a mobile object position indicated by the position information of the nearby mobile object, and a pedestrian area closest to the mobile object position;

corrects the position information of the nearby mobile object such that the corrected position of the nearby mobile object is in the pedestrian area when a distance between the mobile object position and the pedestrian area is shorter than a distance between the mobile object position and the closest road; and corrects the position information of the nearby mobile object such that the corrected position of the nearby mobile object is at the side end portion of the closest road which is closer to the nearby mobile object when the distance between the mobile object position and the pedestrian area is equal to or longer than the distance between the mobile object position and the closest road.

17. The position information correcting device according to claim 10, further comprising:
   a host terminal position acquiring unit that acquires position information of a host terminal;
   a host mobile object type acquiring unit that acquires a mobile object type of a mobile object for which the host terminal is used; and
   a transmission processing unit that transmits the position information acquired by the host terminal position acquiring unit and mobile object type information indicating the mobile object type acquired by the host mobile object type acquiring unit.

* * * * *